US007770158B2

(12) United States Patent
Osborne et al.

(10) Patent No.: US 7,770,158 B2
(45) Date of Patent: Aug. 3, 2010

(54) SOURCE CODE TRANSLATOR

(75) Inventors: John Alexander Osborne, San Francisco, CA (US); Jeffrey Scott Miller, Tiburon, CA (US); Alexander Rothschild Aickin, San Francisco, CA (US); Raja Mani, Union City, CA (US); Adrian Peter McDermott, San Francisco, CA (US); David Vydra, Oakland, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 789 days.

(21) Appl. No.: 10/966,359

(22) Filed: Oct. 14, 2004

(65) Prior Publication Data

US 2006/0101429 A1    May 11, 2006

(51) Int. Cl.
  *G06F 9/44* (2006.01)
  *G06F 9/45* (2006.01)
(52) U.S. Cl. .................. 717/137; 717/116; 717/146; 717/163; 717/165
(58) Field of Classification Search .................. None
  See application file for complete search history.

(56) References Cited

U.S. PATENT DOCUMENTS

| 5,729,748 | A | 3/1998 | Robbins et al. |
| 6,314,429 | B1 | 11/2001 | Simser |
| 6,484,309 | B2 | 11/2002 | Nowlin, Jr. et al. |
| 2003/0056203 | A1 | 3/2003 | Micco et al. |
| 2004/0103405 | A1 | 5/2004 | Vargas |
| 2004/0230959 | A1* | 11/2004 | Vick et al. .................. 717/140 |
| 2006/0031820 | A1* | 2/2006 | Li .................. 717/137 |

FOREIGN PATENT DOCUMENTS

| WO | WO 01/16730 | 3/2001 |
| WO | 2006/044235 A2 | 4/2006 |
| WO | 2006/044235 A3 | 1/2007 |

OTHER PUBLICATIONS

Bill Venners, "Exceptions in Java Language and Virtual Machine", Published in JavaWorld, Jun. 1998, pp. 1-4.*

(Continued)

*Primary Examiner*—Tuan Q Dam
*Assistant Examiner*—Zheng Wei
(74) *Attorney, Agent, or Firm*—Townsend and Townsend and Crew, LLP

(57) ABSTRACT

A method, computer program product, and apparatus comprise providing a Java developer kit class library comprising first Java classes; providing a Java Open Foundation class library comprising second Java classes each containing one or more of the first Java classes; providing a .NET SDK class library comprising .NET classes; providing a .NET language Open Foundation class library comprising first .NET language classes each containing one or more of the .NET classes; wherein each of the .NET language classes presents the same method signature as one of the second Java classes; receiving Java source code defining third Java classes, first calls to the first Java classes, and second calls to the second Java classes; translating the third Java classes into second .NET language classes; and translating the first calls to calls into the .NET SDK class library without modifying the second calls.

12 Claims, 3 Drawing Sheets

OTHER PUBLICATIONS

Octopus, "Octopus .NET Translator" 2003, [Retrieved Online httpL//www/remotesoft.com/octopus/intro.html] pp. 1-2.*

Grant Plamer, Technical Java: Developing Scientific and Engineering Application, Publisher: Prentice Hall, Pub Date: Apr. 21, 2003, ISBN: 0-13-101815-9, pp. 1-7.*

IEEE 100 The Authoritative Dictionary of IEEE Standards Terms 7th edition ISBN 0-7381-2601-2 published 2000, p. 1051.*

Alan Eagle, et al., iNET—Write in .Net, Run Anywhere, Stryon, Inc., White Paper, 2003, 17 pages.

Website printout INFO: The Java Language Conversion Assistant (JLCA) is Now Available, 2 pages, printed Oct. 21, 2004.

Jones, et al., C# for Java Developers, Microsoft Press, 14 pgs. of excerpts from Chapters 1 and 2, esp. pp. 7 and 13 (Sep. 2002).

Dyer, Java decompilers compared, JavaWorld, Jul. 1997, accessed Sep. 28, 2006 at www.javaworld.com/javaworld/jw-07-decompilers_p.html, esp. the summary on p. 1.

International Search Report for PCT/US05/36069.

The Written Opinion of the International Searching Authority for PCT Application No. PCT/US2005/036069, dated Nov. 20, 2006, 4 pages.

International Preliminary Report on Patentability for PCT Application No. PCT/US2005/036069, dated Apr. 17, 2007, 5 pages.

Wikipedia, Shim (Computing), Jun. 6, 2004. retrieved from http://en.wikipedia.org/w/index.php?title=shim_(computing)&oldid=6961885, retrieved on Dec. 2, 2008.

Supplemental European Search Report dated Dec. 2, 2008, 5 pages.

* cited by examiner

SOURCE CODE TRANSLATOR

BACKGROUND

The present invention relates generally to computer programming languages, and particularly to automatically translating source code from one such language into another.

Many popular computer programming languages are currently available. But while a developer may create an application in one of these languages, a customer may prefer a different language. For this reason developers often make an application available in multiple languages. To achieve this, the developer has two choices: to simply write the application from scratch in each of the languages, or to write the application in one language and convert the resulting source code into other languages.

Because the former option is resource-intensive, efforts have centered on the latter, and in particular, on ways to automate the translation of source code from one language to another. These efforts have met with limited success. For example, a tool called JConvert was provided by Microsoft Corporation to automatically convert Java source code to C# source code. However, while JConvert does reasonably well when converting classes, it fails to convert a substantial number of library calls. This is understandable given the many differences between Java library classes and C# library classes.

SUMMARY

In general, in one aspect, the invention features a method, computer program product, and apparatus. The method comprises providing a Java developer kit class library comprising a plurality of first Java classes; providing a Java Open Foundation class library comprising a plurality of second Java classes each containing one or more of the first Java classes; providing a .NET software developer kit class library comprising a plurality of .NET classes; providing a .NET language Open Foundation class library comprising a plurality of first .NET language classes each containing one or more of the .NET classes; wherein each of the .NET language classes presents the same method signature as one of the second Java classes; receiving Java source code defining third Java classes, one or more first calls to one or more of the first Java classes, and one or more second calls to one or more of the second Java classes; translating the third Java classes into second .NET language classes; and translating the first calls to calls into the .NET software developer kit class library without modifying the second calls.

Particular implementations can include one or more of the following features. The first and second .NET languages are selected from the group consisting of C#; C++; and VB.NET. The method further comprises generating Microsoft Intermediate Language based on the second .NET language classes, the calls to the .NET software developer kit class library, the second calls, the .NET language Open Foundation class library, and the .NET software developer kit class library. The method further comprises generating Java bytecode based on the Java source code, the Java Open Foundation class library, and the Java developer kit class library; and wherein the third Java classes are translated to the second .NET language classes based on the Java bytecode. The first calls comprise calls to at least one of the group consisting of object classes; exception classes; and string classes.

The details of one or more implementations are set forth in the accompanying drawings and the description below. Other features will be apparent from the description and drawings, and from the claims.

Figure 1:
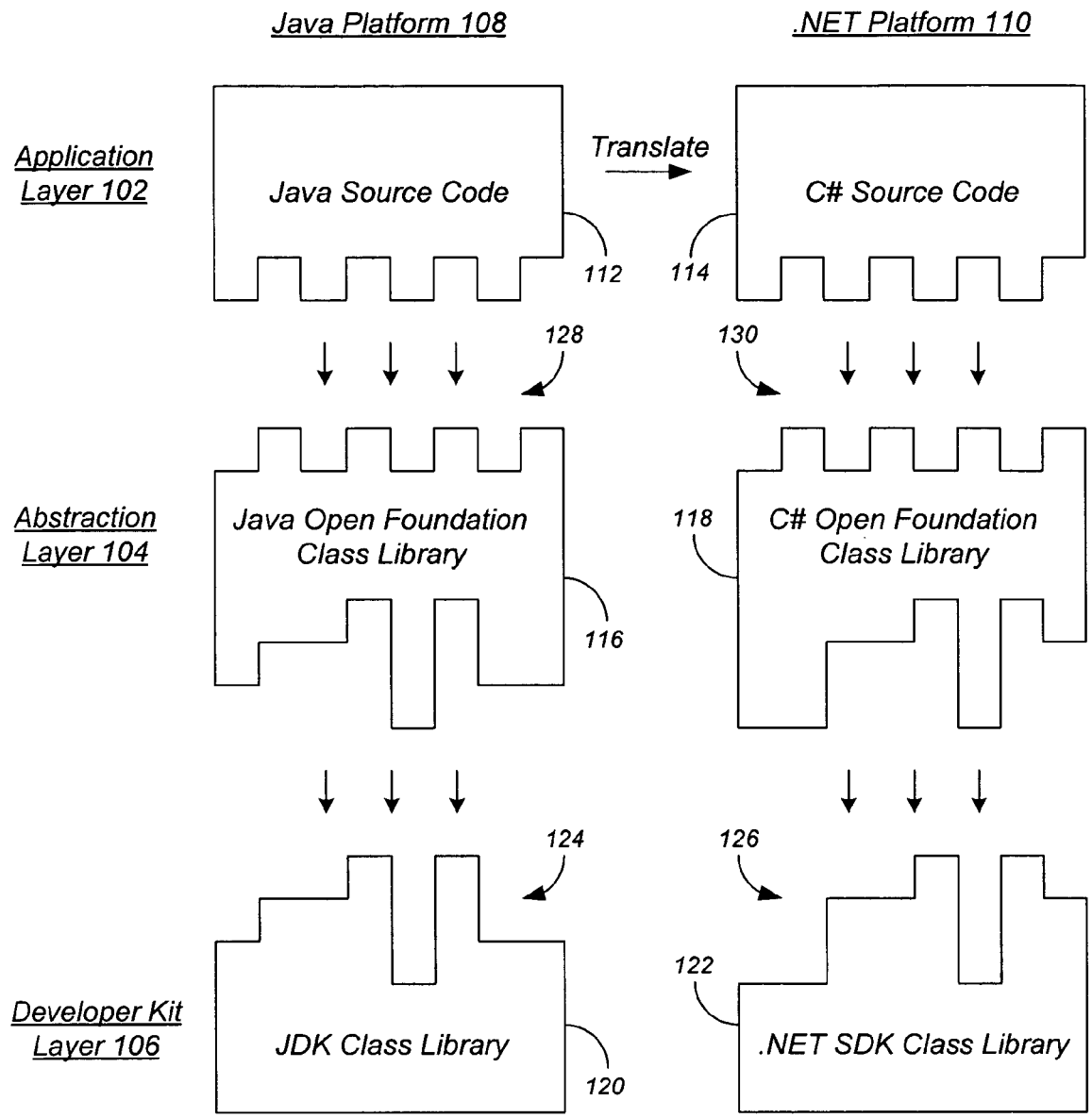
FIG. 1 illustrates the relationships among the original Java source code, the translated C# source code, and the class libraries according to a preferred embodiment.

The leading digit(s) of each reference numeral used in this specification indicates the number of the drawing in which the reference numeral first appears.

DETAILED DESCRIPTION

Embodiments of the present invention succeed in automatically translating Java source code into .NET languages such as C++, C#, and VB.NET quickly and without error by providing abstraction layers for the Java and .NET class libraries that present identical interfaces to the source code. This technique permits the translation process to avoid the pitfalls of attempting to translate all of the Java class library calls to analogous .NET class library calls, and instead limits the translation to the Java classes in the Java source code and only a handful of the Java class library calls. The resulting .NET language source code can be compiled into Microsoft Intermediate Language code using the untranslated calls which now reference the abstraction layer for the .NET class library.

FIG. 1 illustrates the relationships among the original Java source code, the translated C# source code, and the class libraries according to a preferred embodiment. For clarity, embodiments of the present invention are discussed in the context of translating Java source code into source code for one particular .NET language, C#. However, the concepts presented herein are equally applicable to any .NET language, that is, any language that can be compiled into Microsoft Intermediate Language (MSIL) code.

Referring to FIG. 1, the relationships are presented in three layers for two platforms. The layers comprise an application layer 102, an abstraction layer 104, and a developer kit layer 106. The platforms comprise a Java platform 108 and a .NET platform 110.

Application layer 102 comprises Java source code 112 for Java platform 102 that is translated into C# source code 114 for .NET platform 110 as described below. Java source code 112 and C# source code 114 rely upon classes provided at developer kit layer 106 by a commercially-available Java Developer Kit (JDK) Class Library 120 for Java platform 102 and a commercially-available .NET Software Developer Kit (SDK) Class Library 122 for .NET platform 110.

As illustrated graphically in FIG. 1, the JDK interface 124 presented by JDK Class Library 120 differs significantly from the .NET SDK interface 126 presented by .NET SDK Class Library 122. In other words, JDK interface 124 and .NET SDK interface 126 have different method signatures, meaning interfaces 124 and 126 expose different methods and parameters to the developer. For this reason, conventional source code translators have attempted to translate library calls to libraries such as JDK Class Library 120 by attempting to substitute one or more corresponding calls to .NET Class Library 122, often unsuccessfully, for example producing thousands of errors for the translation of a single application.

To avoid this difficulty, embodiments of the present invention provide "Open Foundation" class libraries at abstraction layer 104 to normalize the class library interfaces presented to application layer 102. Referring again to FIG. 1, a Java Open Foundation Class Library 116 is provided at abstraction layer 104 for Java Platform 108, and a C# Open Foundation Class Library 118 is provided at abstraction layer 104 for .NET Platform 110.

Java Open Foundation Class Library 116 comprises a plurality of classes that each contain one or more of the classes in JDK Class Library 120. Similarly, C# Open Foundation Class Library 118 comprises a plurality of classes that each contain one or more of the classes in .NET SDK Class Library 122. Each of the C# classes in the C# Open Foundation Class Library 118 presents the same interface (method signatures and properties) as one of the Java classes in Java Open Foundation Class Library 116. Therefore the Java Open Foundation interface 128 presented to application layer 102 for Java Platform 108 is identical to the C# Open Foundation interface 130 presented to application layer 102 for .NET Platform 110.

Because the interfaces 128, 130 presented to application layer 102 are identical, the class library calls in Java source code 112 are not modified during translation. Each unmodified class library call in translated C# source code 110 then refers to a class in C# Open Foundation Class Library 118 that corresponds to the class in Java Open Foundation Class Library 116 referred to by the corresponding class library call in Java source code 112.

While most of the class library calls are not translated, some of the class library calls are preferably translated for technical reasons. For example, native Java object classes (java.lang.Object) and native Java exception classes (java.lang.Exception) are always translated to their native c# analogues (i.e. System.Object and System.Exception). In addition, some of the class library calls are preferably translated for pragmatic reasons. For example, because string classes are so commonly used, it is preferable to translate string classes rather than force developers to use Open Foundation class library calls, simply to ease the development process.

Figure 2:
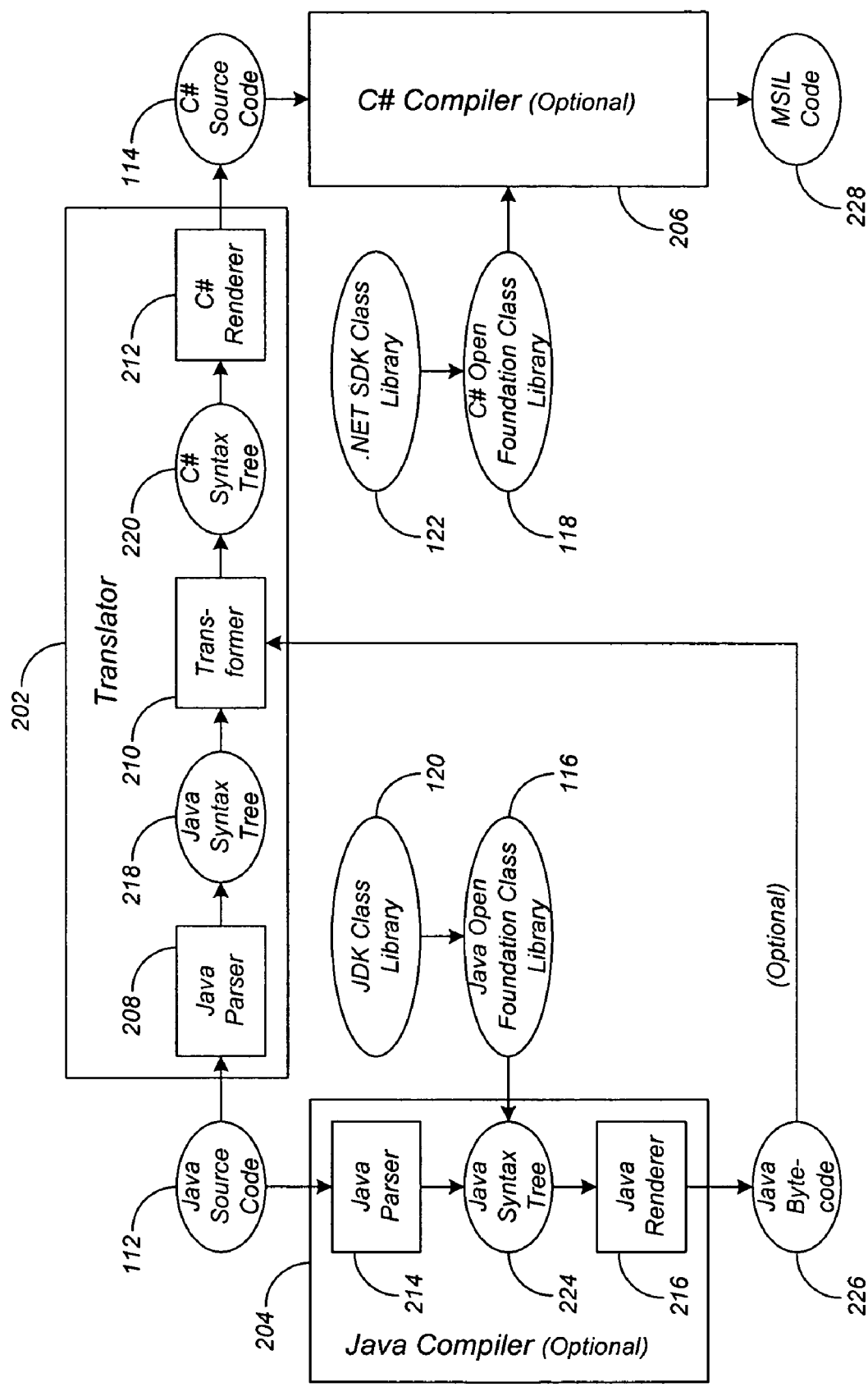
FIG. 2 shows a flow diagram for Java-to-C# translation according to a preferred embodiment.

FIG. 2 shows a flow diagram for Java-to-C# translation according to a preferred embodiment. In FIG. 2, files are shown as ellipses and processes are shown as rectangles. Process 300 comprises a translator 202, an optional Java compiler 204, and an optional C# compiler 206. Translator 202 comprises a Java parser 208, a transformer 210, and a C# renderer 212. Java compiler 204 comprises a Java parser 214 and a Java renderer 216.

Figure 3:
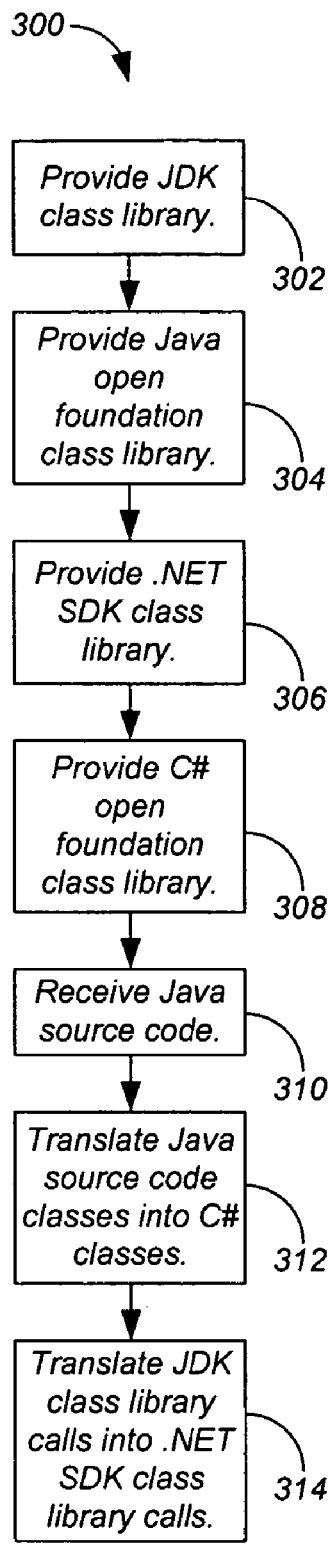
FIG. 3 shows a flowchart for a Java-to-C# translation process according to a preferred embodiment.

FIG. 3 shows a flowchart for a Java-to-C# translation process 300 according to a preferred embodiment. Process 300 provides JDK class library 120 comprising a plurality of Java classes (step 302). Process 300 also provides Java Open Foundation class library 116 comprising a plurality of Java classes each containing one or more of the Java classes in JDK class library 120 (step 304), as described above.

Similarly, process 300 provides .NET SDK class library 122 comprising a plurality of .NET language classes (step 306) and C# Open Foundation class library 118 comprising a plurality of C# classes each containing one or more of the .NET language classes in .NET SDK class library 122 (step 308), also as described above. Each of the C# classes in C# Open Foundation class library 118 presents the same method signature as one of the Java classes in Java Open Foundation class library 116, as described above.

Process 300 receives Java source code 112 (step 310) defining Java classes, one or more calls to the Java classes in Java Open Foundation class library 116, and one or more calls to the Java classes in JDK class library 120.

Process 300 translates the Java classes defined by Java source code 112 into C# classes (step 312), and translates the calls to the Java classes in JDK class library 120 into calls to the .NET language classes in .NET SDK class library 122 (step 314) without modifying the calls to the Java classes in Java Open Foundation class library 116. Because Open Foundation class libraries 116 and 118 present the same interface, the untranslated calls can now be used as calls to C# Open Foundation class library 118 when compiling the translated C# classes into MSIL code 228.

The operation of translator 202 of FIG. 2 is now explained in greater detail with reference to FIG. 2. Java parser 208 parses Java source code 112 to create a Java syntax tree 218, according to techniques that are well-known in the relevant arts. Transformer 210 then converts Java syntax tree 218 into C# syntax tree 220 according to source code translation techniques that are well-known in the relevant arts. C# renderer 212 then renders C# syntax tree 220 as C# source code 114, also according to techniques that are well-known in the relevant arts. C# source code 114 can be compiled into MSIL code 228 by C# compiler 206 based on .NET SDK class library 122 and C# Open Foundation class library 118 according to techniques that are well-known in the relevant arts.

Preferably, transformer 210 employs Java bytecode 226 compiled by Java compiler 204 to convert Java syntax tree 218 into C# syntax tree 220. Java parser 214, which can be implemented in the same manner as Java parser 208, parses Java source code 112 to create a Java syntax tree 224, which can be the same as Java syntax tree 220. Java renderer 216 then produces Java bytecode 226 based on Java syntax tree 224, Java Open Foundation class library 116, and JDK class library 120.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. Computer-readable media embodying instructions executable by a computer to:
provide a first class library comprising a first plurality of classes of a first language;
provide a second class library comprising a second plurality of classes of the first language each containing one or more of the first plurality of classes of the first language;
provide a third class library comprising a first plurality of classes of a second language;
provide a fourth class library comprising a second plurality of classes of the second language each containing one or more of the first plurality of classes of the second language;
receive source code of the first language defining a third plurality of classes of the first language, one or more calls to one or more of the first plurality of classes of the first language, and one or more calls to one or more of the second plurality of classes of the first language;
translate the third plurality of classes of the first language into a third plurality of classes of the second language;
translate the calls to the first plurality of classes of the first language into calls to the third class library without modifying the calls to the second plurality of classes of the first language; and
generate intermediate language code based on the second plurality of classes of the second language, the calls to the third class library, the calls to the second plurality of classes of the first language, the fourth class library, and the third class library,
wherein the calls to the first plurality of classes of the first language comprise calls to object classes or string classes or both,
wherein the source code of the first language relies upon classes of the first class library, wherein the source code of the second language relies upon classes of the third class library, wherein the second plurality of classes of the first language normalize the interfaces of the classes of the first class library, and wherein the second plurality of classes of the second language normalize the interfaces of the classes of the third class library,
wherein the fourth class library is such that classes of the fourth class library have the same method signatures as corresponding classes in the second class library, and
wherein the translation of source code of the first language into source code of the second language does not require the translation of the second class library, but instead calls to a class of the second class library become calls to a corresponding class in the fourth class library with the same method signature.

2. The computer-readable medium of claim 1, wherein all of the classes of the first class library have different method signatures from all of the classes of the third class library.

3. Computer-readable media embodying instructions executable by a computer to:
provide a first class library comprising a first plurality of classes of a first language;
provide a second class library comprising a second plurality of classes of the first language each containing one or more of the first plurality of classes of the first language;
provide a third class library comprising a first plurality of classes of a second language;
provide a fourth class library comprising a second plurality of classes of the second language each containing one or more of the first plurality of classes of the second language;
receive source code of the first language defining a third plurality of classes of the first language, one or more calls to one or more of the first plurality of classes of the first language, and one or more calls to one or more of the second plurality of classes of the first language;
translate the third plurality of classes of the first language into a third plurality of classes of the second language;
translate the calls to the first plurality of classes of the first language into calls to the third class library without modifying the calls to the second plurality of classes of the first language; and
generate bytecode of the first language based on the source code of the first language, the second class library, and the first class library; and wherein the third plurality of classes of the first language are translated into the third plurality of classes of the second language based on the bytecode of the first language,
wherein the calls to the first plurality of classes of the first language comprise calls to object classes or string classes or both,
wherein the source code of the first language relies upon classes of the first class library, wherein the source code of the second language relies upon classes of the third class library, wherein the second plurality of classes of the first language normalize the interfaces of the classes of the first class library, and wherein the second plurality of classes of the second language normalize the interfaces of the classes of the third class library,
wherein the fourth class library is such that classes of the fourth class library have the same method signatures as corresponding classes in the second class library, and
wherein the translation of source code of the second language into source code of the first language does not require the translation of the fourth class library, but instead calls to a class of the fourth class library become calls to a corresponding class in the second class library with the same method signatures.

4. The computer-readable medium of claim 3, wherein all of the classes of the first class library have different method signatures from all of the classes of the third class library.

5. A method comprising:
providing to a processor of a computer system a first class library comprising a first plurality of classes of a first language;
providing to the processor of the computer system a second class library comprising a second plurality of classes of the first language each containing one or more of the first plurality of classes of the first language;
providing to the processor of the computer system a third class library comprising a first plurality of classes of a second language;
providing to the processor of the computer system a fourth class library comprising a second plurality of classes of the second language each containing one or more of the first plurality of classes of the second language;
receiving at the processor of the computer system source code of the first language defining a third plurality of classes of the first language, one or more calls to one or more of the first plurality of classes of the first language, and one or more calls to one or more of the second plurality of classes of the first language;

translating by the processor of the computer system the third plurality of classes of the first language into a third plurality of classes of the second language;

translating by the processor of the computer system the calls to the first plurality of classes of the first language into calls to the third class library without modifying the calls to the second plurality of classes of the first language; and generating by the processor of the computer system intermediate language code based on the second plurality of classes of the second language, the calls to the third class library, the calls to the second plurality of classes of the first language, the fourth class library, and the third class library, wherein the calls to the first plurality of classes of the first language comprise calls to object classes or string classes or both, wherein the source code of the first language relies upon classes of the first class library, wherein the source code of the second language relies upon classes of the third class library, wherein the second plurality of classes of the first language normalize the interfaces of the classes of the first class library, and wherein the second plurality of classes of the second language normalize the interfaces of the classes of the third class library, wherein the fourth class library is such that classes of the fourth class library have the same method signatures as corresponding classes in the second class library, and wherein the translation of source code of the first language into source code of the second language does not require the translation of the second class library, but instead calls to a class of the second class library become calls to a corresponding class in the fourth class library with the same method signature.

6. The method of claim 5, wherein all of the classes of the first class library have different method signatures from all of the classes of the third class library.

7. A method comprising:
providing to a processor of a computer system a first class library comprising a first plurality of classes of a first language;
providing to the processor of the computer system a second class library comprising a second plurality of classes of the first language each containing one or more of the first plurality of classes of the first language;
providing to the processor of the computer system a third class library comprising a first plurality of classes of a second language;
providing to the processor of the computer system a fourth class library comprising a second plurality of classes of the second language each containing one or more of the first plurality of classes of the second language;
receiving at the processor of the computer system source code of the first language defining a third plurality of classes of the first language, one or more calls to one or more of the first plurality of classes of the first language, and one or more calls to one or more of the second plurality of classes of the first language;
translating by the processor of the computer system the third plurality of classes of the first language into a third plurality of classes of the second language;
translating by the processor of the computer system the calls to the first plurality of classes of the first language into calls to the third class library without modifying the calls to the second plurality of classes of the first language; and generating by the processor of the computer system bytecode of the first language based on the source code of the first language, the second class library, and the first class library; and wherein the third plurality of classes of the first language are translated into the third plurality of classes of the second language based on the bytecode of the first language, wherein the source code of the first language relies upon classes of the first class library, wherein the source code of the second language relies upon classes of the third class library, wherein the second plurality of classes of the first language normalize the interfaces of the classes of the first class library, and wherein the second plurality of classes of the second language normalize the interfaces of the classes of the third class library, wherein the fourth class library is such that classes of the fourth class library have the same method signatures as corresponding classes in the second class library, and wherein the translation of source code of the second language into source code of the first language does not require the translation of the fourth class library, but instead calls to a class of the fourth class library become calls to a corresponding class in the second class library with the same method signatures.

8. The method of claim 7, wherein all of the classes of the first class library have different method signatures from all of the classes of the third class library.

9. An apparatus comprising:
means for providing a first class library comprising a first plurality of classes of a first language;
means for providing a second class library comprising a second plurality of classes of the first language each containing one or more of the first plurality of classes of the first language;
means for providing a third class library comprising a first plurality of classes of a second language;
means for providing a fourth class library comprising a second plurality of classes of the second language each containing one or more of the first plurality of classes of the second language;
means for receiving source code of the first language defining a third plurality of classes of the first language, one or more calls to one or more of the first plurality of classes of the first language, and one or more calls to one or more of the second plurality of classes of the first language;
means for translating the third plurality of classes of the first language into a third plurality of classes of the second language;
means for translating the calls to the first plurality of classes of the first language into calls to the third class library without modifying the calls to the second plurality of classes of the first language; and
means for generating intermediate language code based on the second plurality of classes of the second language, the calls to the third class library, the calls to the second plurality of classes of the first language, the fourth class library, and the third class library, wherein the calls to the first plurality of classes of the first language comprise calls to object classes or string classes or both, wherein the source code of the first language relies upon classes of the first class library, wherein the source code of the second language relies upon classes of the third class library, wherein the second plurality of classes of the first language normalize the interfaces of the classes of the first class library, and wherein the second plurality of classes of the second language normalize the interfaces of the classes of the third class library, wherein the fourth class library is such that classes of the fourth class library have the same method signatures as corresponding classes in the second class library, wherein the translation of source code of the first language into source code of the second language does not require the translation of the second class library, but instead calls to a class of the second class library become calls to a corresponding class in the fourth class library with the same method signature, and wherein the means run on at least one processor.

10. The apparatus of claim 9, wherein all of the classes of the first class library have different method signatures from all of the classes of the third class library.

11. An apparatus comprising:
  means for providing a first class library comprising a first plurality of classes of a first language;
  means for providing a second class library comprising a second plurality of classes of the first language each containing one or more of the first plurality of classes of the first language;
  means for providing a third class library comprising a first plurality of classes of a second language;
  means for providing a fourth class library comprising a second plurality of classes of the second language each containing one or more of the first plurality of classes of the second language;
  means for receiving source code of the first language defining a third plurality of classes of the first language, one or more calls to one or more of the first plurality of classes of the first language, and one or more calls to one or more of the second plurality of classes of the first language;
  means for translating the third plurality of classes of the first language into a third plurality of classes of the second language;
  means for translating the calls to the first plurality of classes of the first language into calls to the third class library without modifying the calls to the second plurality of classes of the first language; and
  means for generating bytecode of the first language based on the source code of the first language, the second class library, and the first class library; and wherein the third plurality of classes of the first language are translated into the third plurality of classes of the second language based on the bytecode of the first language, wherein the source code of the first language relies upon classes of the first class library, wherein the source code of the second language relies upon classes of the third class library, wherein the second plurality of classes of the first language normalize the interfaces of the classes of the first class library, and wherein the second plurality of classes of the second language normalize the interfaces of the classes of the third class library, wherein the fourth class library is such that classes of the fourth class library have the same method signatures as corresponding classes in the second class library, wherein the translation of source code of the second language into source code of the first language does not require the translation of the fourth class library, but instead calls to a class of the fourth class library become calls to a corresponding class in the second class library with the same method signatures, and wherein the means run on at least one processor.

12. The apparatus of claim 11, wherein all of the classes of the first class library have different method signatures from all of the classes of the third class library.

* * * * *